United States Patent
Dudley et al.

(10) Patent No.: US 7,543,817 B2
(45) Date of Patent: Jun. 9, 2009

(54) COMBINATION HAND-HELD GAME AND CANDY DISPENSER

(76) Inventors: John D. Dudley, 3939 Harvey Ave., Western Springs, IL (US) 60558; Michael Edward Stepanek, 2509 N. Walnut Ave., Arlington Heights, IL (US) 60004; David J. Clark, 2779 Randall Ridge Dr., Elgin, IL (US) 60124; Marc Raneses, 426 Cardinal Dr., Bartlett, IL (US) 60103

( * ) Notice: Subject to any disclaimer, the term of this patent is extended or adjusted under 35 U.S.C. 154(b) by 478 days.

(21) Appl. No.: 11/548,356

(22) Filed: Oct. 11, 2006

(65) Prior Publication Data

US 2008/0087681 A1  Apr. 17, 2008

(51) Int. Cl.
A63F 13/02  (2006.01)
B65D 83/04  (2006.01)

(52) U.S. Cl. .................................. 273/46; 221/199
(58) Field of Classification Search .................. 463/37, 463/47; 221/199
See application file for complete search history.

(56) References Cited

U.S. PATENT DOCUMENTS

| | | | | |
|---|---|---|---|---|
| 3,224,776 | A | * | 12/1965 | Mehelich ................. 273/121 R |
| D243,780 | S | * | 3/1977 | Yamagata .................. D21/323 |
| D247,859 | S | * | 5/1978 | Sato .......................... D21/312 |
| 4,733,863 | A | | 3/1988 | Novotny |
| 5,280,908 | A | * | 1/1994 | Lu ........................... 273/121 R |
| 5,460,295 | A | * | 10/1995 | Law ........................... 221/185 |
| D373,511 | S | * | 9/1996 | Militzok ...................... D7/589 |
| D392,342 | S | | 3/1998 | Tyler |
| 5,722,656 | A | * | 3/1998 | Dickerson ............... 273/118 R |
| D399,883 | S | | 10/1998 | Jensen |
| D401,297 | S | | 11/1998 | Fai |
| 5,919,092 | A | | 7/1999 | Yokoi et al. |
| D414,218 | S | | 9/1999 | Chao |
| 5,988,637 | A | * | 11/1999 | Dickerson ................ 273/118 R |
| 6,089,402 | A | * | 7/2000 | Pracas ......................... 221/288 |
| D431,604 | S | | 10/2000 | Chan |
| D432,179 | S | | 10/2000 | Hayes |
| 6,305,685 | B1 | * | 10/2001 | Motosko ................. 273/118 R |
| D453,758 | S | | 2/2002 | Han et al. |
| 6,354,470 | B1 | | 3/2002 | Berger et al. |
| 6,402,619 | B1 | | 6/2002 | Sato |
| 6,443,451 | B1 | | 9/2002 | Cheever |
| D464,996 | S | | 10/2002 | Hussaini et al. |
| 6,598,876 | B1 | * | 7/2003 | Pierce et al. ............. 273/118 R |
| 6,774,901 | B2 | | 8/2004 | Kohira et al. |
| 7,195,241 | B1 | * | 3/2007 | Hartelius ................. 273/119 R |
| 2003/0069052 | A1 | | 4/2003 | Higashiyama et al. |

(Continued)

FOREIGN PATENT DOCUMENTS

JP    2000237447    4/2000

(Continued)

*Primary Examiner*—Raleigh W. Chiu

(57) ABSTRACT

A hand-held combination dispenser and electronic game includes a dispenser housing as outer walls which define at least one interior hallow chamber. The interior chamber can be filled with candy or other items to be dispensed. An electronic game display is mounted on an outer wall. Game controls are also mounted on an outer wall in a location which allows the user to operate the game while holding the dispenser. An exterior surface of the outer walls that define the hollow chambers simultaneously provide a gripping surface adapted for placement of the hands of a user while playing the electronic game.

14 Claims, 8 Drawing Sheets

U.S. PATENT DOCUMENTS

2004/0163990 A1* 8/2004 Begim ................. 206/472
2004/0180709 A1   9/2004 Takahashi et al.
2007/0228661 A1* 10/2007 Bolen ................. 273/447
2008/0087681 A1* 4/2008 Dudley et al. ......... 221/199

FOREIGN PATENT DOCUMENTS

JP      2002140723      5/2002

* cited by examiner

COMBINATION HAND-HELD GAME AND CANDY DISPENSER

FIELD OF THE INVENTION

The present invention relates to a combination hand-held dispenser device for candy and other items with an electronic game embedded in the dispenser housing.

BACKGROUND OF THE INVENTION

Various individual handheld game devices and separate candy dispensers are described in the prior art. Conventional dispensers or games have generally been developed individually and have appealed to both children and adults. However, the game device and candy dispenser have not previously been combined into one integral dispenser package.

One consideration in designing toys is the cost of manufacture. A simple design helps to reduce the manufacturer's cost and improve efficiency. Distributors also have similar considerations. Toys distributed as part of consumer products, such as a meal in a fast food restaurant, require not only a low cost and highly entertaining product, but also a product that does not take up an inordinate amount of space.

From the consumer's perspective, the size, ease of operation, and attractiveness of the product are important points of consideration. It is preferable to have a good grasp on a handheld game while playing to provide proper finger manipulation of the game controls, such as buttons or the like, mounted on the game housing. It is also preferable to have easy access to the candy or other dispensable items inside a candy dispenser. Additionally, it is preferable that the entire toy does not occupy an inordinate amount of space or appear unattractive to the user.

For the foregoing reasons, there is a need for a lightweight, low cost, easy to use hand-held combination electronic game and candy dispenser device.

Various designs for dispensers and game machines are disclosed individually in the prior art. U.S. Pat. No. 6,354,470 entitled "Dispenser Package" and U.S. Pat. No. 6,443,451 entitled "Apparatus for Randomly Dispensing Objects, Kit, and Method of Playing a Game" disclose dispenser packages for holding candy or other dispensable objects. U.S. Pat. No. 6,443,451 also discloses a method of playing a game associated with dispensing the objects. U.S. Pat. No. 6,598,876 entitled "Interactive Board Game With a Tangible Reward" discloses a game board where participants compete for a gumball or play ball prize. U.S. Pat. No. 4,733,863 entitled "Confectionary Game" discloses a confectionary guessing game requiring participants to guess a flavor material. None of the disclosures in these patents teach or suggest a combined hand-held electronic game and candy dispenser.

SUMMARY OF THE INVENTION

An object of the present invention is to provide a combined electronic hand-held game and candy/item dispenser device. The dispenser is manufactured from a durable material and is designed to be low cost, lightweight, and easy to use. The dispenser has an electronic game display mounted on the housing, and finger manipulable game controls are also located on the housing which allow the user to easily operate the game while viewing the electronic display.

In one embodiment of the illustrated dispenser, the dispenser housing has a U-shaped design with the game display mounted between the arms forming the U-shape. Side walls of the dispenser housing define a pair of distinct hollow chambers adapted to hold candy or other items to be stored in and ultimately dispensed from the dispenser. End walls define the outer boundary of the side walls and of the hollow chambers by forming an open port in the housing. Pivotal doors are mounted on the end walls adjacent the open port and facing the chamber in order to provide access to the chambers. The user can open or close the chambers to allow items to be dispensed from the chambers as well as to fill the chambers with candy or other items. When the pivotal doors are closed, the chambers are isolated and the candy is maintained in the dispenser. The pivotal doors have a first fully closed and a second fully open position as well as several intermediate positions to partially open the chambers. The side walls of the dispenser that form the hollow chambers also form handles or grips that provide a grip area for the user to hold the housing with two hands while playing a game and operating the controls with one or both thumbs.

In a second embodiment of the illustrated dispenser, the dispenser housing has a somewhat W-shaped design, with the game display and controls mounted on a sidewall. The end walls and sidewalls define at least one distinct chamber inside the housing, and also form hollow handles for the user to grip the dispenser package when playing the game. The housing also includes at least one port formed integrally with the housing which allows access to the chamber inside the housing to dispense items from or to fill the chamber with candy or other items. A pivotal door is mounted to the housing adjacent to the port to open the port and provide access to the chamber, or to close the port and isolate the chamber. The pivotal door can be molded to fit the contour of the dispenser housing. The port is opened at the user's discretion to dispense candy, or to fill the chambers with candy by moving the pivotal door.

The dispenser of the second embodiment also includes an additional port on the top side of the housing formed integrally with the housing. A pivotal closure member adjacent to the additional port on the top side provides further access to the chambers through the additional port to more easily fill the chambers with items or to dispense candy or other items from the chambers. The pivotal doors and the pivotal closure member have a first fully closed position to hold items in the chambers and a second fully open position to provide access to the chambers to dispense items or to refill the chambers.

In a third embodiment, the display housing also has a somewhat W-shaped design with the game display and controls mounted on a sidewall. The end walls and sidewalls define at least one distinct chamber inside the housing, and also form hollow handles for the user to grip the dispenser package when playing the game. The housing also includes at least one port formed integrally with the housing which allows access to the chamber inside the housing to dispense items from or to fill the chamber with candy or other items. A pivotal door is mounted to the housing adjacent to the port to open the port and provide access to the chamber or to close the port and isolate the chamber. The pivotal doors also include an undulated portion on the outer surface that provides a grip area for the user to hold the housing with both hands and to rest thumbs upon while playing a game and operating the controls with one or both thumbs.

The dispenser housing of the third embodiment also includes an additional port on the top side of the housing formed integrally with the housing. A pivotal closure member adjacent to the additional port on the top side provides further access to the chambers through the additional port to more readily fill the chambers with items or to dispense candy or other items from the chambers. The pivotal doors and the pivotal closure member have a first fully closed position to hold items in the chambers and a second fully open position to provide access to the chambers to dispense items or to refill the chambers.

In a fourth embodiment, the display housing has a generally trapezoidal configuration with the game display and controls also mounted on a sidewall. The endwalls and sidewalls define at least one distinct chamber inside the housing. The housing also includes at least one port formed integrally with the housing that allows access to the chamber inside the housing to fill the chambers or dispense candy or other items from the chambers. A pivotal door is mounted to the housing adjacent to the port to open the port and provide access to the chamber, or to close the port and isolate the chamber.

The dispenser housing of the fourth embodiment also includes an extension structure on the bottom side of the housing that provides a grip area for the user to hold the housing while playing a game and operating the game controls.

DETAILED DESCRIPTION OF THE ILLUSTRATED EMBODIMENTS

Figure 1:
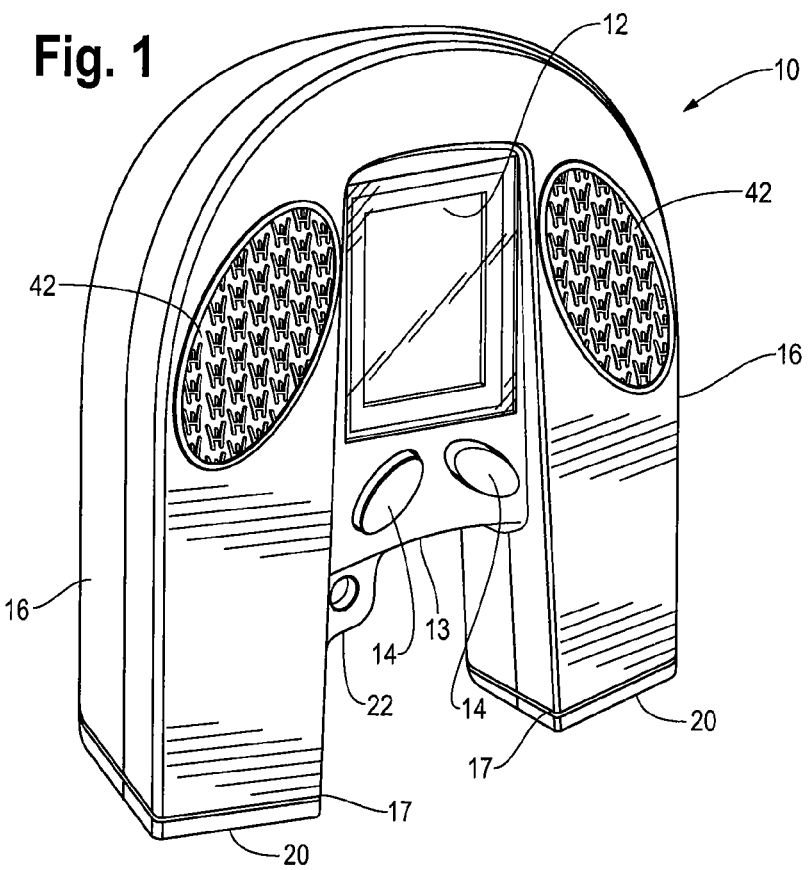
FIG. 1 is a front perspective view of an embodiment of the invention having a U-shaped design.
Figure 2:
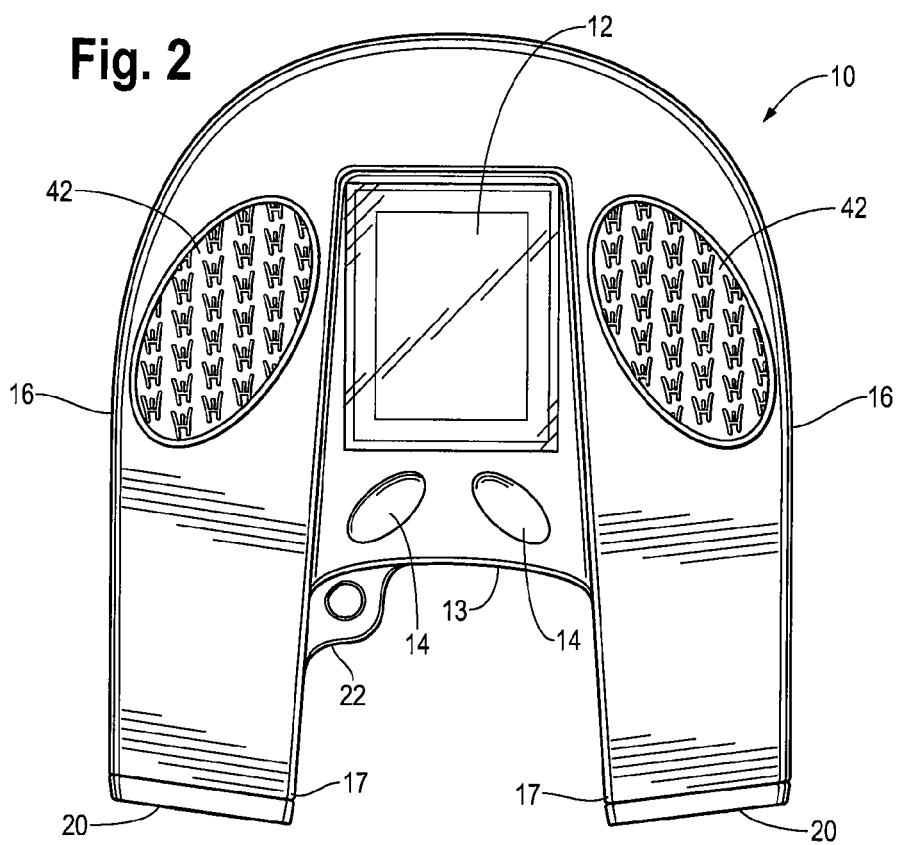
FIG. 2 is a front plan view of the embodiment of the invention shown in FIG. 1.
Figure 3:
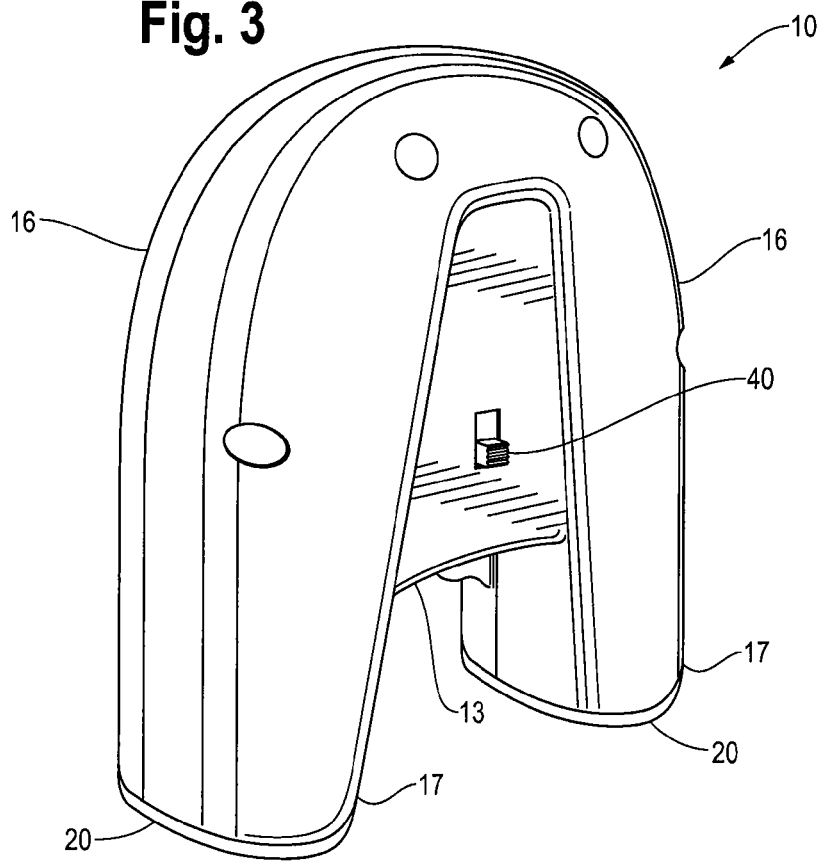
FIG. 3 is a rear perspective view of the embodiment of the invention shown in FIG. 1.

A first embodiment of the combination hand-held game and candy dispenser 8 is illustrated in FIGS. 1-5. The dispenser 8 is manufactured from a durable material, such as plastic, polymer blends, or the like, and is designed to be lightweight, low cost and easy to use. The dispenser in the illustrated embodiment includes an electronic game embedded in a U-shaped dispenser housing 10. An electronic game display 12 is mounted on a central juncture portion 13 of the housing 10, with game controls 14 also mounted on the juncture portion 13 or other location which allows the user to manually operate the game while viewing the display. The game controls 14 can consist of buttons, switches, or the like as appropriate for the game to be played. The housing 10 also includes an on/off switch 40 (FIG. 3) for the user to activate and deactivate the game display 12.

Figure 4:
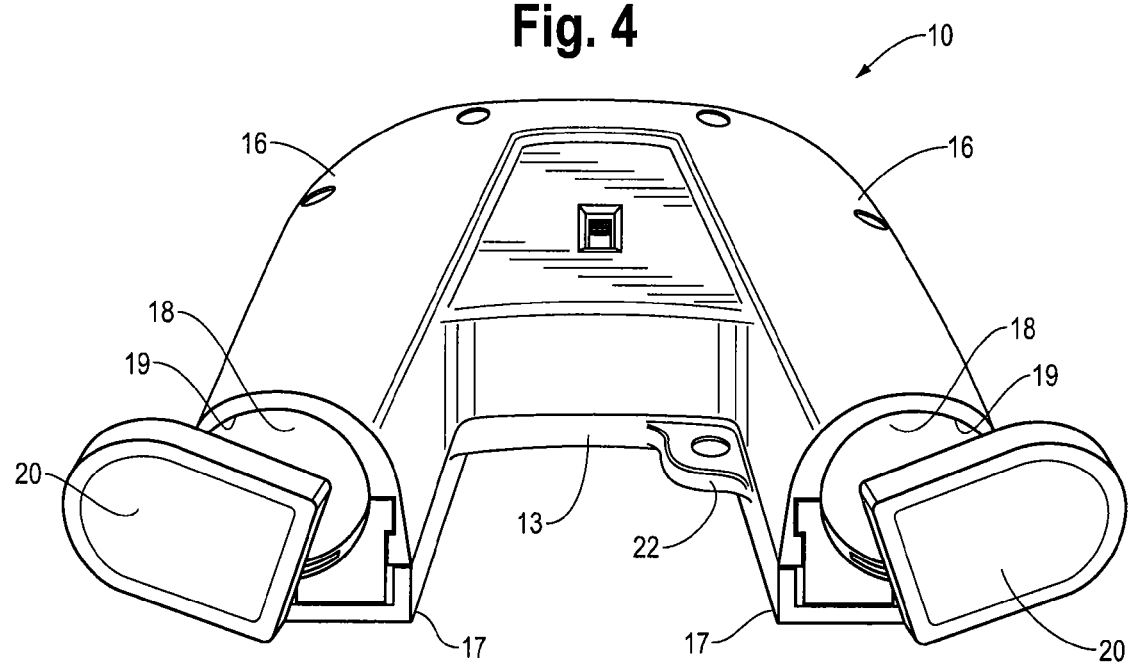
FIG. 4 is a bottom perspective view of the embodiment of the invention shown in FIG. 1 with end caps partially open and allowing access to the chambers.
Figure 5:
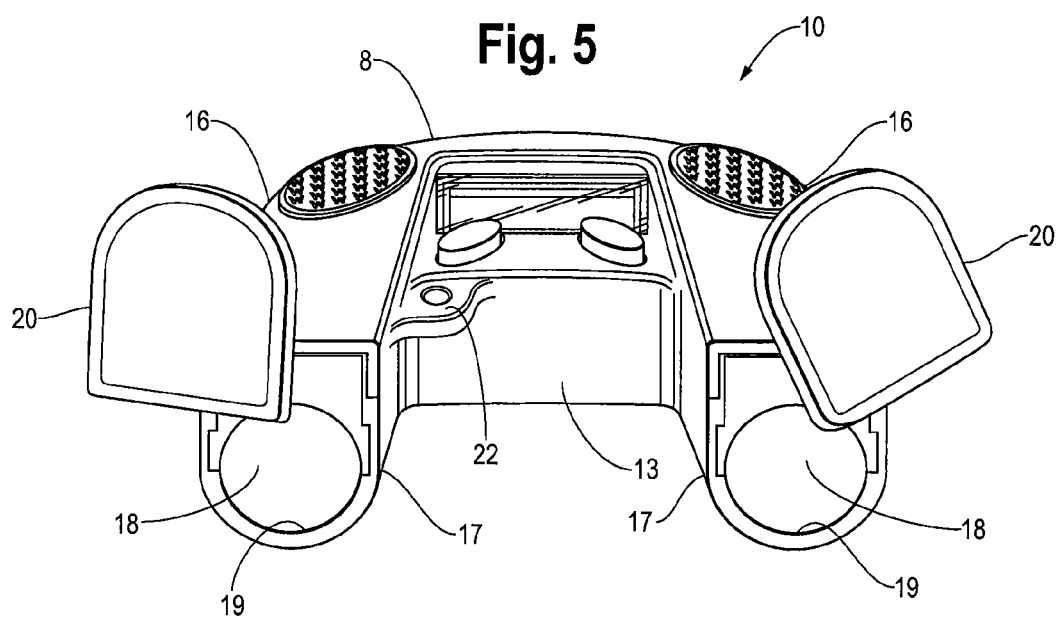
FIG. 5 is a bottom perspective view of the embodiment of the invention shown in FIG. 1 with end caps fully open to allow access to the chambers
Figure 6:
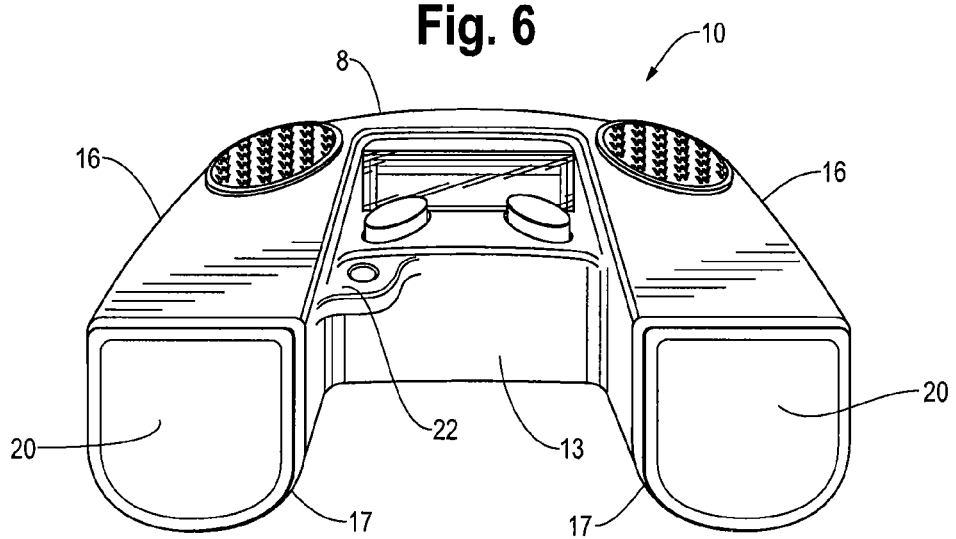
FIG. 6 is a bottom perspective view of the embodiment of the invention shown in FIG. 1 with end caps fully closed to isolate the chambers.
Figure 7:
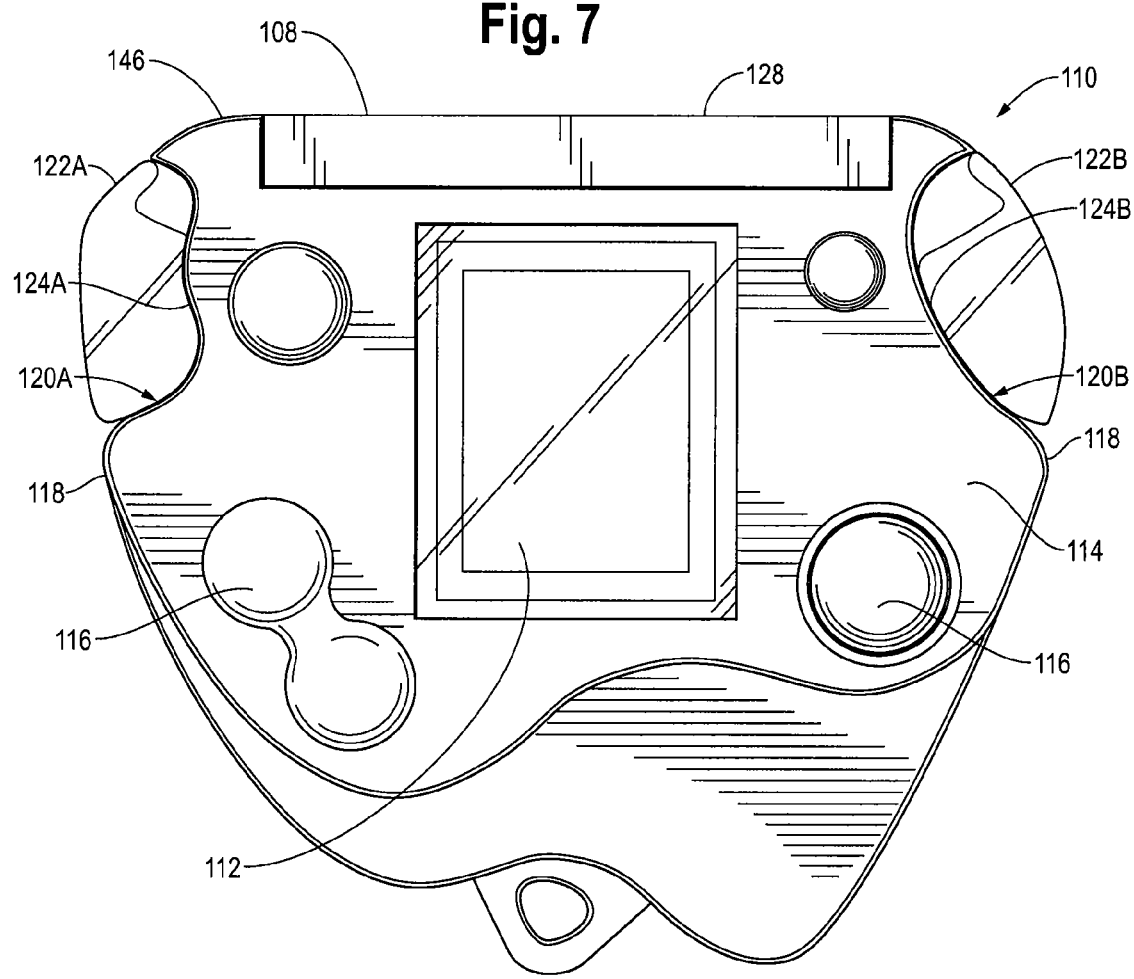
FIG. 7 is a front plan view of an alternate embodiment of the invention having a W-shaped design.
Figure 8:
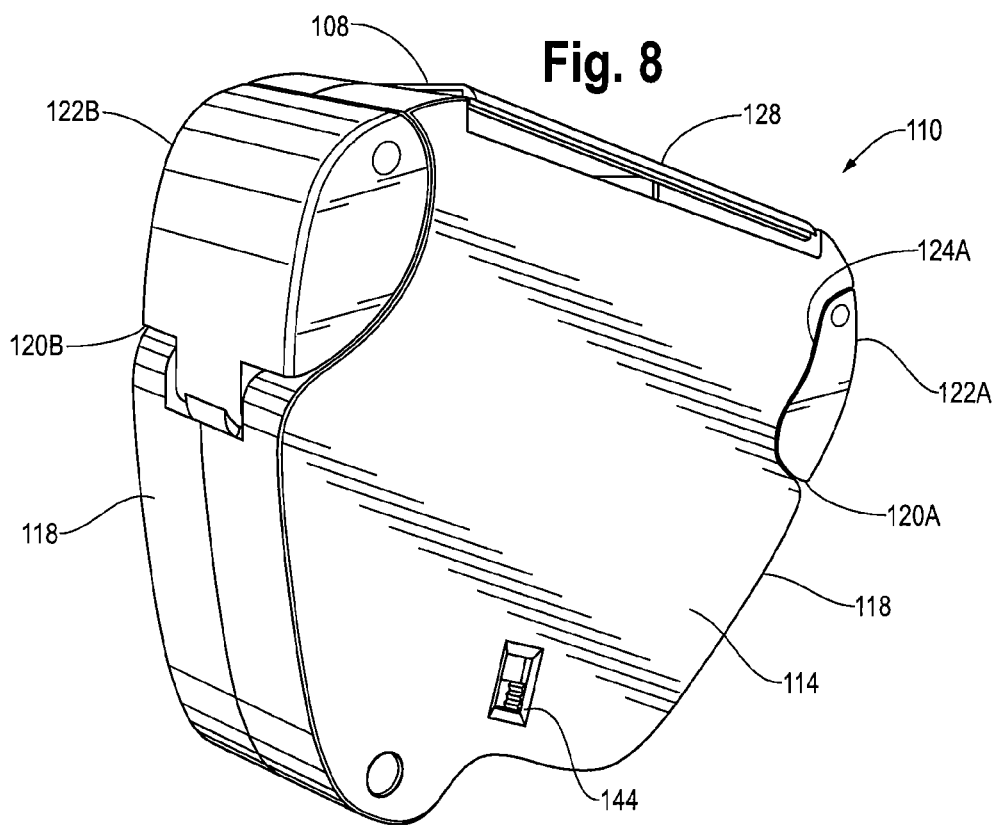
FIG. 8 is a rear perspective view of the embodiment of the invention shown in FIG. 7.
Figure 9:
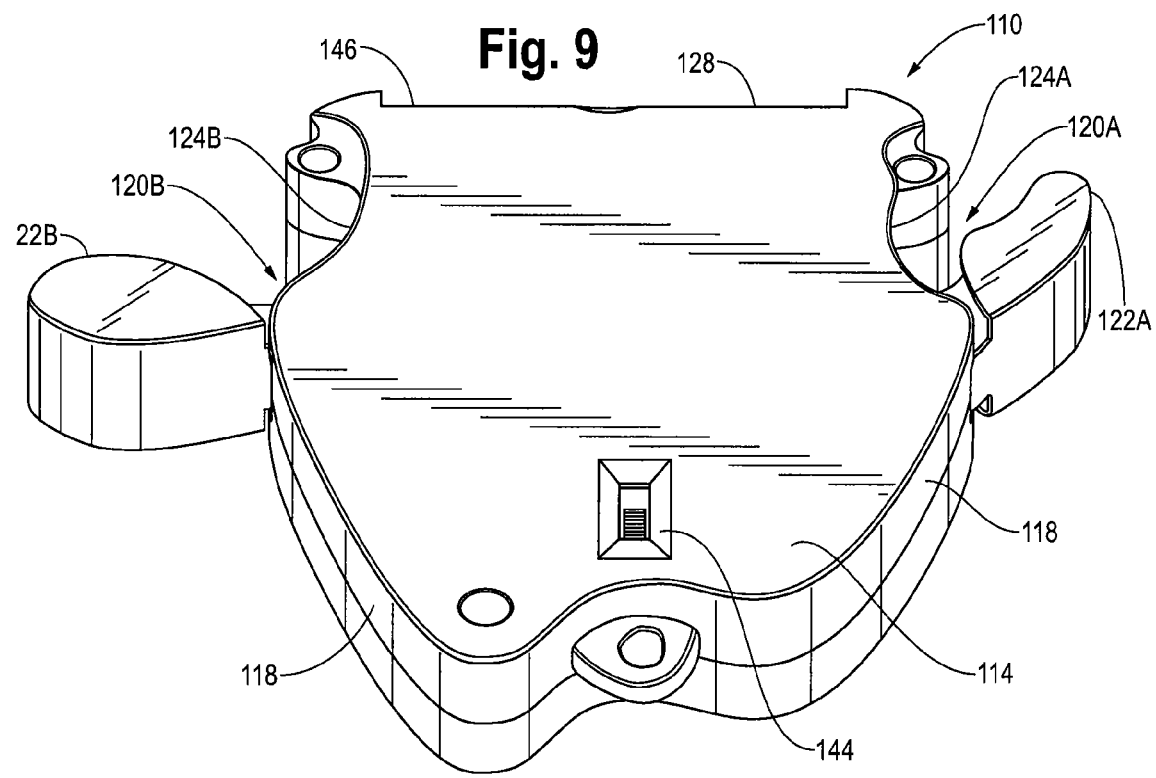
FIG. 9 is a rear perspective view of the embodiment of the invention shown in FIG. 7 with pivotal doors open to allow access through the ports to the hollow chambers.
Figure 10:
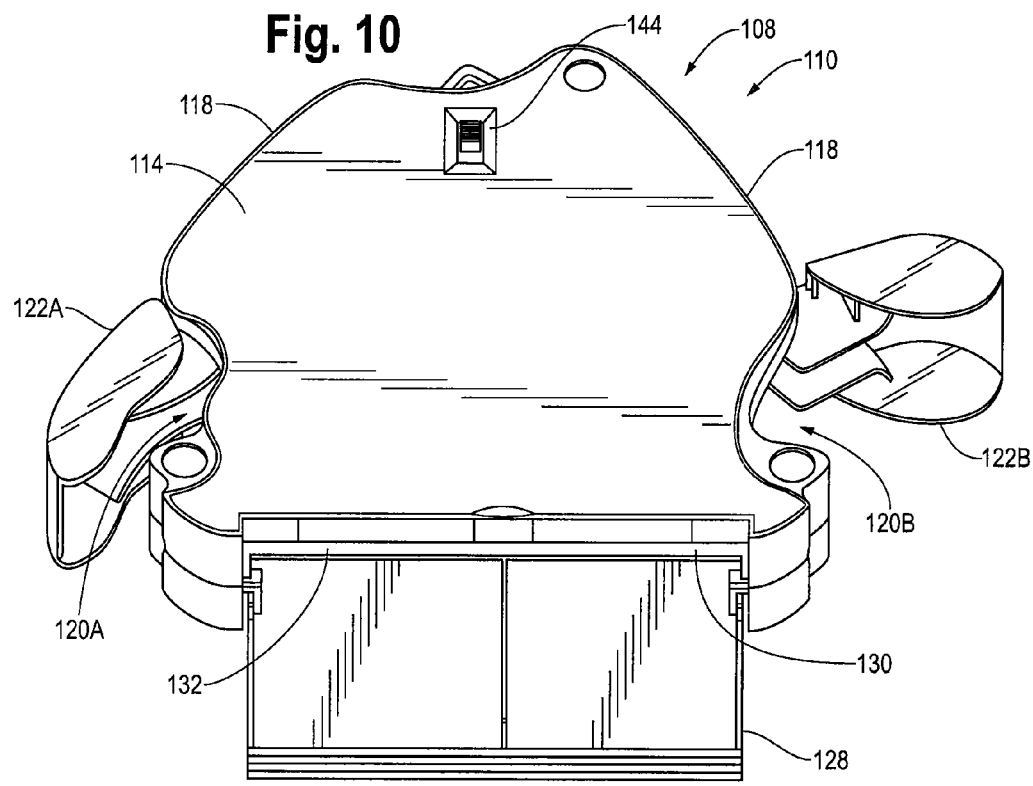
FIG. 10 is a rear perspective view of the embodiment of the invention shown in FIG. 7 with pivotal doors and additional pivotal closure member on top side open to allow access through the ports to the hollow chambers.
Figure 11:
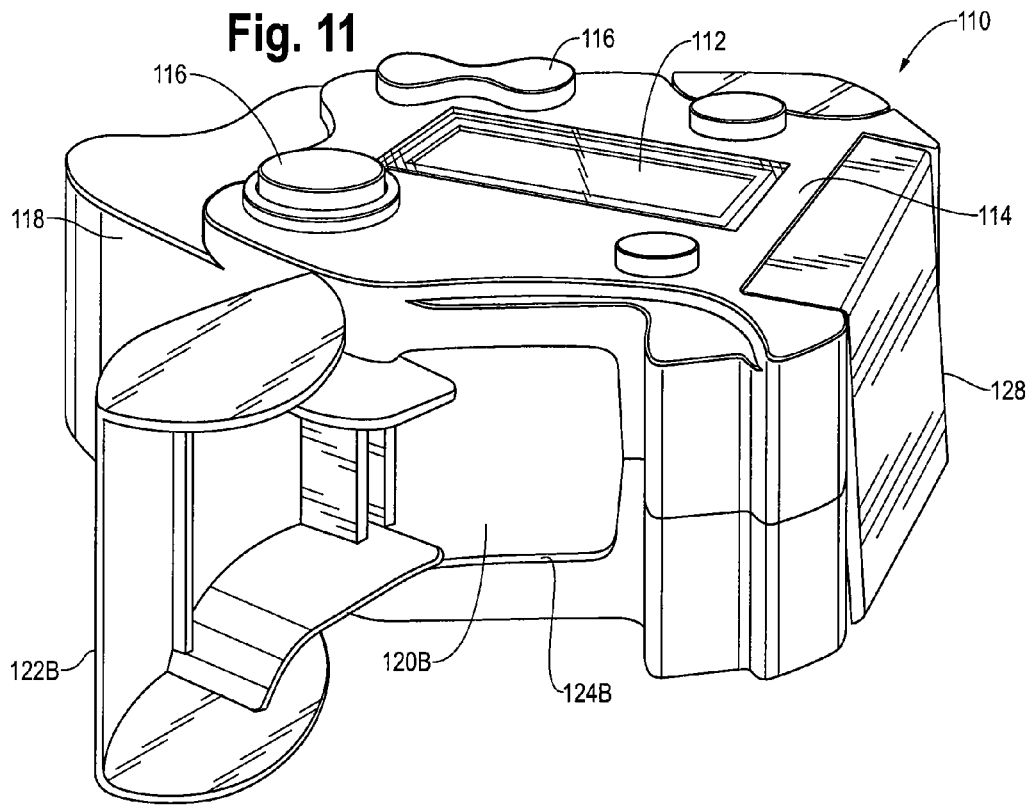
FIG. 11 is a side perspective of the embodiment of the invention shown in FIG. 7 with pivotal door open on the end wall to allow access through the ports to the hollow chambers.

Side walls 16 of the housing 10 define a pair of distinct hollow chambers 18 adapted to hold candy or other items to be dispensed. End walls 17 define the outer edge or boundary of the side walls and of the hollow chamber 18 by forming an open port 19 in the housing 10. Pivotal doors 20 are pivotally mounted on the end walls 17 adjacent to each open port 19 and facing each corresponding chamber 18, to open and close the chambers 18 for the dispensation of items from the chambers 18 and also to fill the chambers 18 with candy or other items. FIG. 4 shows the pivotal doors 20 pivoted to a partially open position. The pivotal doors 20 have a first fully closed position (FIG. 6) and a second fully open position (FIG. 5), as well as several intermediate positions to partially open the chambers 18. The first fully closed position isolates the chambers 18 in order to maintain the candy in the dispenser 8 while a user is playing a game or while the dispenser 8 is not in use. The second fully open position allows the user to dispense candy from the chambers 18 as well as fill the chambers 18 with candy or other items. Pivoting the doors 20 to one of several intermediate positions allows a user to control the amount of items that are dispensed from the chamber 18 or to select the size of candy or other items that are dispensed through various open positions.

A bracket structure 22 shown in FIG. 1 is mounted on the housing and adapted to hold a clip, chain strap, or the like to help prevent loss of the dispenser. The side walls 16 form hollow handles 42 (FIGS. 1-2) which provide a grip area for a user to hold the housing 10 with two hands while playing the game with one or both thumbs operating the controls 14. When the user decides to dispense candy or other items from one of the chambers 18, one of the pivotal doors 20 is rotated to a desired position, thereby opening the respective chamber 18 and providing access to the items in the chamber. The user at his or her discretion can return the pivotal door 20 to the closed position again to isolate the chamber 18 and maintain the candy or other items in the dispenser 8.

The embodiment of the invention disclosed in FIGS. 1-6 provides a combination dispenser housing 10 and video game 12 with controls 14, where the sidewalls 16 that define hollow chambers 18 provide a user with handle-like grips to hold the housing 10 with two hands while playing the game 12. The hollow chambers 18, besides defining the handle-like grips to be engaged by a user's hand, also are selectively opened and closed to hold or dispense candies or other items in or from chambers 18 respectively.

An alternate embodiment of the combined hand-held game and candy dispenser is illustrated in FIGS. 7-11. The game and candy dispenser 108 includes a somewhat W shaped housing 110 having front and back side walls 114, a top side 146, and at least two end walls 118 for the dispenser housing 110. The dispenser 108 is manufactured from a durable material, such as plastic, polymer blends, or the like, and is designed to be lightweight, low cost and easy to use. The dispenser 108 also includes a game display 112 mounted on a front side wall 114 of the dispenser. Game controls 116 are mounted on the side wall 114 or other location which allows a user to easily operate the game while viewing the game display 112 and gripping the housing 110. The game controls 116 can consist of buttons, switches, or the like as appropriate for the game to be played. The dispenser 108 also includes an on/off switch 144 (FIGS. 8-10) for the user to activate the game display 112.

End walls 118 along with the front and back sidewalls 114 define at least one distinct chamber 120 inside the housing 110. The housing 110 includes at least one port 124 formed integrally with the housing 110 that allows access to chamber 120 inside the housing 110 to dispense items from or to fill the chambers with candy or other items. At least one pivotal door 122 is mounted to the housing 110 adjacent to the at least one port 124. In the embodiment illustrated in FIGS. 7-11, two independent chambers 120A and 120B as well as two ports 124A and 124B are formed in the housing 110, the ports 124A and 124B providing access to the respective chambers. Likewise, two pivotal doors 122A and 122B are mounted to the housing 110 adjacent to the ports 124A and 124B respectively. The pivotal doors 122A and 122B may be molded to fit the contour of the housing, and will selectively open the ports 124A and 124B to provide access to the chambers 120A and 120B in the housing 110, or will selectively close the ports 124A or 124B to isolate the chambers 120A or 120B. The ports 124A and/or 124B are opened at the user's discretion to dispense items, or to fill chambers 120A and/or 120B with candy or other items by moving the at least one pivotal door.

The dispenser 108 also includes additional ports 130 and 132 on the top side 146 of the housing 110. The additional ports 130 and 132 are also formed integrally with the dispenser housing. Additionally, pivotal closure member 128 adjacent to the additional ports 130 and 132 provides further access to both chambers 120A and 120B through ports 130 and 132 to fill the chambers 120A and 120B more easily with candy or other items, or to dispense items from the chambers 120A and 120B. The pivotal closure member 128 pivots to a first closed position to prevent access to the chambers 120A and 120B, and to maintain items in the chambers 120A and 120B when the W shaped dispenser 108 is used for game playing or the dispenser 108 is not in use. The closure member 128 has a second fully open position that allows the user to dispense candy from the chambers 120A and 120B or to fill the chambers 120A and/or 120B with candy or other items.

The pivotal doors 122A and 122B snap to a first fully closed position (FIG. 8) to hold candy in respective chambers 120A and 120B, and to a second fully opened position (FIGS. 9-11) to provide access to the candy in chambers 120A and 120B. Additionally, pivotal closure member 128 snaps to either a fully open or fully closed position.

When the user decides to dispense candy, the at least one pivotal door 122 is snapped to the open position, thereby opening the respective chamber 120A or 120B and providing access to the items in the chamber 120A or 120B. (FIGS. 9, 11) The user at his or her discretion can return the pivotal doors 122A or 122B to the closed position again to isolate the chambers 120A or 120B and maintain the candy or other items in the dispenser 108. (FIG. 8) The user can also dispense items from the dispenser 108 or refill the dispenser 108 by snapping the pivotal closure member 128 to the open position, thereby again providing access to the chambers 120A and 120B. (FIG. 10) Further, the user at his or her discretion can return the pivotal closure member 128 to the closed position again to isolate the chambers 120A and 120B and maintain the candy or other items in the dispenser 108.

As described in connection with the embodiment of FIGS. 1-6, the embodiment of the invention disclosed in FIGS. 7-11 provides a combination dispenser housing 110 and video game 112 with controls 116, where the walls 114 and 118 that define hollow chambers 120A and 120B provide a user with handle-like grips to hold the housing 110 with two hands while playing the game 112. The hollow chambers 120A and 120B, besides defining the hand-held grips to be engaged by a user's hand, also are selectively opened and closed to hold or dispense candies or other items in or from the chambers 120A and 120B, respectively.

Figure 12:
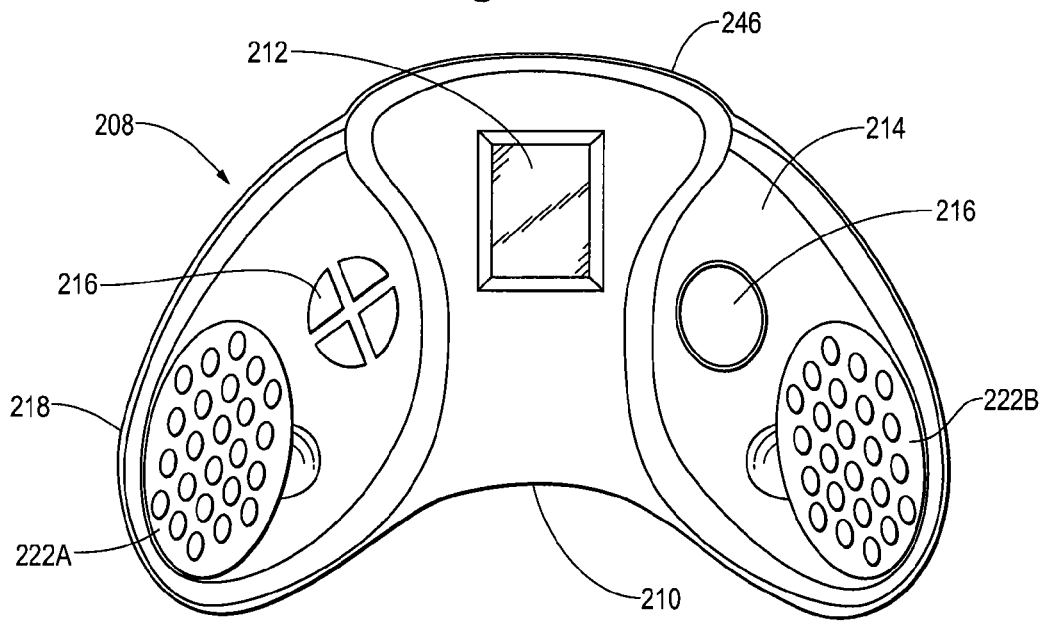
FIG. 12 is a front plan view of a third embodiment of the invention having a generally W-shaped design.
Figure 13:
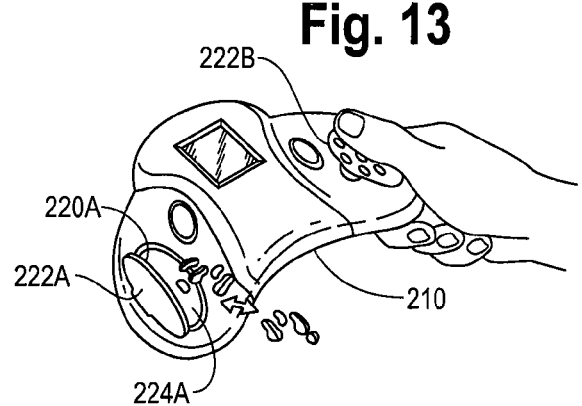
FIG. 13 is a front perspective view of the embodiment of the invention shown in FIG. 12 with a pivotal door open to allow access through the ports to one of the hollow chambers.
Figure 14:
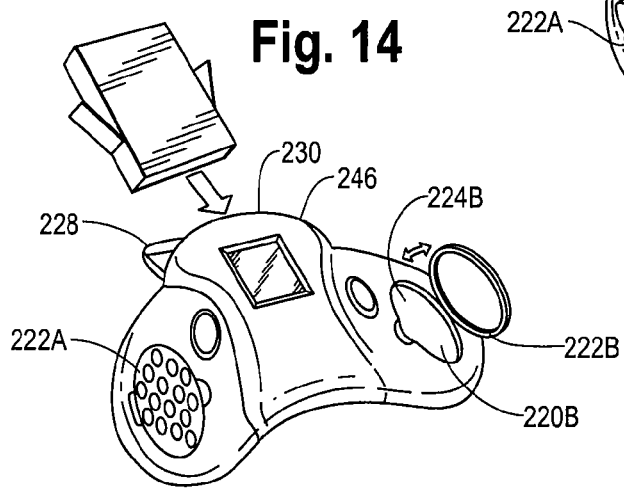
FIG. 14 is a front perspective view of the embodiment of the invention shown in FIG. 12 with the pivotal door open and the additional pivotal closure member open to allow access through the ports to the hollow chambers.

A third embodiment of the combined hand-held game and candy dispenser is illustrated in FIGS. 12-14. The game and candy dispenser 208 includes a generally W shaped housing 210 having front and back side walls 214, a top or upper side 246, and at least two end walls 218 for the dispenser housing 210. The dispenser 208 is manufactured from a durable material, such as plastic, polymer blends, or the like, and is designed to be lightweight, low cost and easy to use. The dispenser 208 also includes a game display 212 mounted on a front side wall 214 of the dispenser. Game controls 216 are mounted on the side wall 214 in the illustrated embodiment which controls allow a user to easily operate the game while viewing the game display 212 and gripping the housing 210. The game controls 216 can consist of buttons, switches, or the like as appropriate for the game to be played.

End walls 218 along with the front and back sidewalls 214 define at least one distinct chamber 220 inside the housing 210. The housing 210 includes at least one port 224 (FIGS. 13-14) formed integrally with the housing 210, each port 224 providing access to one of the distinct chambers 220 formed inside the housing 210 to dispense items from or to fill the chambers with candy or other items. At least one pivotal door 222 is mounted to the housing 210 adjacent to each of the ports 224. In the embodiment illustrated in FIGS. 12-14, two independent chambers 220A and 220B as well as two ports 224A and 224B are formed in the housing 210, the ports 224A and 224B providing access to the respective chambers. Likewise, two pivotal doors 222A and 222B are mounted on the housing adjacent to each of the ports 224A and 224B respectively. The pivotal doors 222A or 222B will selectively open the ports 224A or 224B to provide access to the chambers 220A or 220B in the housing 210, or will selectively close the ports 224A and/or 224B to isolate and close the chambers 220A or 220B. The ports 224A and/or 224B are opened at the user's discretion to dispense items, or to fill one or both chambers 220A or 220B with candy or other items by moving the at least one pivotal door. The pivotal door, besides providing access to the chambers, also includes an undulated portion on the outer surface of the door which allows a user to grip the dispenser with one or both thumbs while playing the game.

The dispenser 208 also includes additional port 230 (FIG. 14) on the top or upper side 246 of the housing 210. The additional port 230 is formed integrally with the dispenser housing. Additionally, pivotal closure member 228 adjacent to the additional port 230 provides further access to both chambers 220A and 220B through port 230 to fill the chambers 220A and 220B more easily with candy or other items, or to dispense items from the chambers 220A and 220B. The pivotal closure member 228 pivots to a first closed position to prevent access to the chambers 220A and 220B and to maintain items in the respective chambers 220A and 220B when the dispenser 208 is used for game playing, or when the dispenser 208 is not in use. The closure member 228 has a second fully open position that allows the user to dispense candy from the chambers 220A and 220B or to fill the chambers 220A and/or 220B with candy or other items.

When the user decides to dispense candy, the at least one pivotal door 222 is snapped to the open position, thereby opening the respective chamber 220A or 220B and providing access to the items in the chamber 220A or 220B. (FIG. 13) The user at his or her discretion can return the pivotal door 222 to the closed position again to isolate the chambers 220A and 220B and maintain the candy or other items in the dispenser 208. (FIG. 12) The user can also dispense items from the dispenser 208 or refill the dispenser 208 by snapping the pivotal closure member 228 to the open position, thereby again providing access to the chambers 220A and 220B. (FIG. 14) Further, the user at his or her discretion can return the pivotal closure member 228 to the closed position again to isolate the chambers 220A and 220B and maintain the candy or other items in the dispenser 208.

As described in connection with the embodiment of FIGS. 1-6, the embodiment of the invention disclosed in FIGS. 12-14 also provides a combination dispenser housing 210 and video game 212 with controls 216, where the walls 214 and 218 that define hollow chambers 220A and 220B provide a user with handle-like grips to hold the housing 210 with two hands while playing the game 212. The hollow chambers 220A and 220B, besides defining the hand-held grips to be engaged by a user's hand, also are selectively opened and closed to hold or dispense candies or other items in or from the chambers 220A and 220B, respectively.

Figure 15:
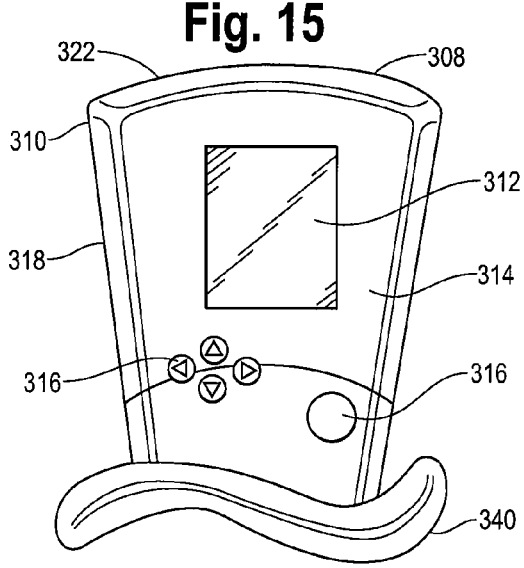
FIG. 15 is a front plan view of a fourth embodiment of the invention having a generally trapezoidal configuration.
Figure 16:
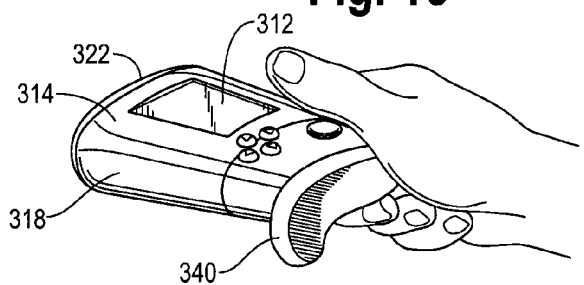
FIG. 16 is a side perspective view of the embodiment of the invention shown in FIG. 15 with a user gripping the invention while in use.
Figure 17:
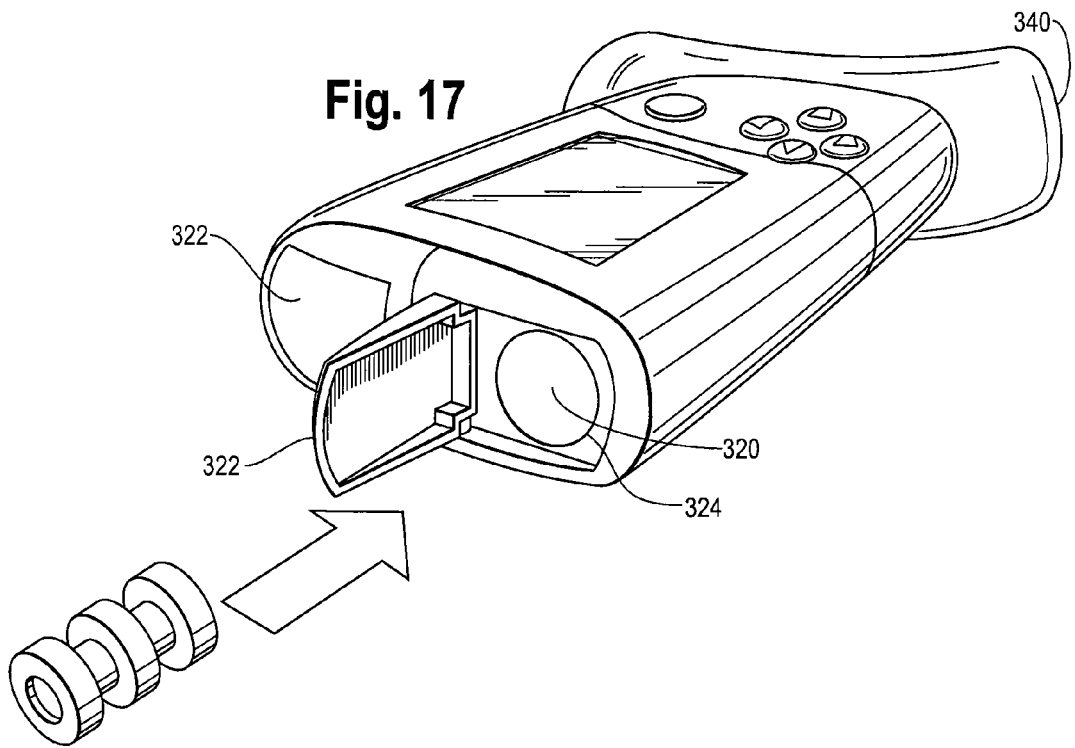
FIG. 17 is a top perspective view of the embodiment of the invention shown in FIG. 15 with pivotal doors open to allow access through the ports to the interior hollow chambers.

A fourth embodiment of the combination hand-held game and candy dispenser 308 is illustrated in FIGS. 15-17. The dispenser 308 is manufactured from a durable material, such as plastic, polymer blends, or the like, and is designed to be lightweight, low cost and easy to use. The dispenser in the illustrated embodiment includes an electronic game embedded in a generally trapezoidal-shaped dispenser housing 310, having front and back sidewalls and at least two end walls. An electronic game display 312 is mounted on the housing 310, with game controls 316 also mounted on the housing 310 in a location that allows the user to manually operate the game while viewing the display. The game controls 316 can consist of buttons, switches, or the like as appropriate for the game to be played.

Referring to FIGS. 16 and 17, sidewalls 314 and end walls 318 of the housing 310 define a pair of distinct hollow chambers 320 adapted to hold candy or other items to be dispensed by forming at least one open port 324 in the housing 310. The housing 310 includes at least one port 324 formed integrally with the housing 310 that allows access to one of the chambers 320 inside the housing 310 to dispense items from or to fill the chamber 320 with candy or other items. Pivotal doors 322 are mounted on the dispenser housing 310 adjacent to each open port 324 and facing each corresponding chamber 320, to open and close the chambers 320 for the dispensation of items from the chambers 320 and also to fill the chambers 320 with candy or other items. FIG. 17 shows the pivotal doors 322 in their open position. The pivotal doors 322 have a first fully closed position (FIGS. 15 and 16) and a second fully open position (FIG. 17). The first fully closed position isolates the chambers 320 to maintain the candy in the dispenser 308 while a user is playing a game or while the dispenser 308 is not in use. The second fully open position allows the user to dispense candy from the chambers 320 as well as fill the chambers 320 with candy or other items.

The dispenser housing of the fourth embodiment also includes an extension structure 340 attached to or formed integrally with the dispenser housing 310 which provides an additional grip area for the user to hold the housing while playing a game and operating the game controls. In this embodiment, the side walls 314 and end walls 318 define the primary grip area when a user is playing the game, while the sidewalls 314 and end walls 318 simultaneously form the hollow chambers 320. When the user decides to dispense candy or other items from one of the chambers 320, one of the pivotal doors 322 is opened to provide access to the items in the chamber 320. The user at his or her discretion can return the pivotal door 322 to the closed position again to isolate the chamber 320 and maintain the candy or other items in the dispenser 308.

As described in connection with the embodiment of FIGS. 1-6, the embodiment of the invention disclosed in FIGS. 15-17 also provides a combination dispenser housing 310 and video game and display 312 with controls 316, where the sidewalls 314 define hollow chambers 320 to be selectively opened and closed to hold or dispense candies or other items in or from chambers 320 respectively. The sidewalls 314 and endwalls 318 in conjunction with an extension structure 340 also define hand-held grips to be engaged by a user's hand.

The foregoing description of illustrated embodiments of the invention has been presented for purposes of description, and is not intended to be exhaustive or to limit the invention to the precise forms disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A hand-held combination item dispenser and electronic game comprising:

a dispenser housing;

outer walls of the dispenser housing defining at least one interior hollow chamber in the housing, the at least one chamber adapted to releasably hold said items for dispensing;

at least one opening in the dispenser housing, the at least one opening communicating with the at least one interior hollow chamber;

an electronic game display mounted on at least one of the outer walls of the dispenser;

at least one game control element also mounted on at least one of the outer walls of the dispenser, the at least one game control element adapted to be manually manipulated by a user of the combination item dispenser and electronic game;

an exterior surface of the outer walls of the dispenser housing that defines said at least one interior hollow chamber providing a gripping surface adapted for placement of the hands of a user playing the electronic game.

2. The hand-held combination item dispenser and electronic game of claim 1, wherein the at least one interior hollow chamber comprises two spaced apart hollow chambers, the outer walls comprising a central juncture portion extending between the two interior hollow chambers, the electronic game display mounted on the central juncture portion.

3. The hand-held combination item dispenser and electronic game of claim 1 further comprising at least one door pivotally mounted on the outer walls, each at least one door located adjacent to one of the at least one openings, each at least one door having a first fully closed position isolating the at least one chamber and adapted to maintain the items in the dispenser; each at least one door having a second fully open position allowing the at least one chamber to be accessed from outside of the outer walls.

4. The hand-held combination item dispenser and electronic game of claim 3 wherein the at least one door also provides several intermediate positions varying the degree of accessibility of each at least one opening.

5. The hand-held combination item dispenser and electronic game of claim 3 wherein the at least one door includes an undulated outer surface forming part of the gripping surface, the gripping surface adapted to be held by a user when the at least one door is in the first fully closed position and while the game is being played.

6. The hand-held combination item dispenser and electronic game of claim 1, wherein the gripping surface is adapted to be held by a user while playing the electronic game, and to operate the game by manipulating the at least one game control element.

7. The hand-held combination item dispenser and electronic game of claim 1 further comprising a bracket structure mounted on the dispenser housing, the bracket adapted to hold a support element.

8. The hand-held combination item dispenser and electronic game of claim 1 wherein the at least one game control element is a button adapted to be manually manipulated by a user.

9. The hand-held combination item dispenser and electronic game of claim 1 wherein the dispenser is configured in a general "U" shape.

10. The hand-held combination item dispenser and electronic game of claim 1 wherein the dispenser is configured in a general "W" shape.

11. The hand-held dispenser of claim 1 further comprising at least one additional opening on a side of the housing, the additional opening integrally formed with the housing and communicating with the interior chamber of the housing.

12. The hand-held combination item dispenser and electronic game of claim 11 further comprising an additional pivotal closure member adjacent to the additional opening, the closure member being pivotally movable between a first fully closed position preventing access to the at least one hollow chamber, and a second fully open position allowing the chamber to be accessible from the outside of the dispenser housing.

13. The hand-held combination item dispenser and electronic game of claim 1 wherein the dispenser is configured in a generally trapezoidal shape.

14. The hand-held combination item dispenser and electronic game of claim 13 wherein the dispenser housing includes an extension structure adapted to be gripped by a user while playing the game.

* * * * *